(12) United States Patent
Moore et al.

(10) Patent No.: US 10,067,224 B2
(45) Date of Patent: Sep. 4, 2018

(54) TIME TO DIGITAL CONVERTER (TDC) WITH SYNCHRONOUS OUTPUT AND RELATED METHODS

(71) Applicant: STMICROELECTRONICS (RESEARCH & DEVELOPMENT) LIMITED, Marlow Bucks (GB)

(72) Inventors: John Kevin Moore, Edinburgh (GB); Neale Dutton, Edinburgh (GB)

(73) Assignee: STMICROELECTRONICS (RESEARCH & DEVELOPMENT) LIMITED, Marlow Bucks (GB)

( * ) Notice: Subject to any disclaimer, the term of this patent is extended or adjusted under 35 U.S.C. 154(b) by 371 days.

(21) Appl. No.: 14/920,344

(22) Filed: Oct. 22, 2015

(65) Prior Publication Data

US 2017/0115381 A1 Apr. 27, 2017

(51) Int. Cl.
*G01S 7/48* (2006.01)
*G01S 7/486* (2006.01)
*G04F 10/00* (2006.01)

(52) U.S. Cl.
CPC .......... *G01S 7/4865* (2013.01); *G01S 7/4861* (2013.01); *G04F 10/005* (2013.01)

(58) Field of Classification Search
CPC ....... G04F 10/005; H03L 7/085; H03L 7/087; H03L 2207/50; G01C 3/08
See application file for complete search history.

(56) References Cited

U.S. PATENT DOCUMENTS

| 2011/0148490 | A1* | 6/2011 | Lee | H03L 7/085 |
| | | | | 327/159 |
| 2012/0133921 | A1* | 5/2012 | Moore | G01S 7/486 |
| | | | | 356/28 |
| 2015/0041625 | A1 | 2/2015 | Dutton et al. | |
| 2015/0188583 | A1 | 7/2015 | Ravi et al. | |
| 2017/0038738 | A1* | 2/2017 | Zhou | G04F 10/005 |

OTHER PUBLICATIONS

Translation for WO2015161640, this is continuation that Zhou (20170038738) is related to.*
Zanuso et al. "Time-To-Digital Converter With 3-PS Resolution and Digital Linearization Algorithm" www.eecs.berkeley.edu: retrieved from internet on Sep. 30, 2015; pp. 4.

* cited by examiner

*Primary Examiner* — Luke D Ratcliffe
(74) *Attorney, Agent, or Firm* — Slater Matsil, LLP

(57) ABSTRACT

A time to digital converter (TDC) may include a sampling stage configured to sample an input signal based upon a plurality of timing signals having different respective phases, and provide a respective output for each of the different timing signals. A first synchronization stage may be configured to receive the outputs from the sampling stage, synchronize a first subset of the outputs to a first one of the plurality of timing signals, and synchronize a second subset of the outputs to a second one of the plurality of timing signals. A second synchronization stage may be configured to receive the synchronized outputs from the first synchronization stage, and synchronize all of the synchronized outputs from the first synchronization stage to the first one of the plurality of timing signals.

19 Claims, 11 Drawing Sheets

| TIMING CONTROL SETTING | STEP SIZE | DYNAMIC RANGE (CLOCK PERIODS) |
|---|---|---|
| 1 | 1 TDC BIN | 4N |
| 2 | 2 TDC BINS | 8N |
| 3 | 4 TDC BINS | 16N |
| 4 | 8 TDC BINS | 32N |
| 5 | 16 TDC BINS | 64N |

TIME TO DIGITAL CONVERTER (TDC) WITH SYNCHRONOUS OUTPUT AND RELATED METHODS

TECHNICAL FIELD

The present disclosure relates to imaging applications, and more particularly to optical ranging systems and related methods.

BACKGROUND

Time of flight imaging is used in a number of applications including range finding, depth profiling, 3D imaging (e.g. LIDAR), and medical imaging techniques. Direct time of flight measurement involves measuring the length of time between emitting radiation and sensing the radiation after reflection from an object. From this, the distance to the object can be determined. In specific applications, the sensing of the reflected radiation may be performed using a Single Photon Avalanche Diode (SPAD) array. SPAD arrays have been used as solid-state detectors in imaging applications where high sensitivity and timing resolution are required.

A SPAD is based on a p-n junction device biased beyond its breakdown region. The high reverse bias voltage generates a sufficient magnitude of electric field such that a single charge carrier introduced into the depletion layer of the device causes a self-sustaining avalanche via impact ionization. The avalanche is quenched, either actively or passively, to allow the device to be "reset" to detect further photons. The initiating charge carrier may be photo-electrically generated by a single incident photon striking the high field region. This single photon detection mode of operation is often referred to as "Geiger Mode".

Time to digital converters are sometimes used in time of flight imaging applications to convert an event arrival time to a time-stamped digital output. Often system requirements require the time to digital converter timing resolution to be over that of a single clock cycle. One example time to digital converter configuration is set forth in U.S. Pat. Pub. No. 2015/0041625 to Dutton et al., which is assigned to the present Applicant and is hereby incorporated herein in its entirety by reference. This time to digital converter includes a sample module operable to sample an input signal at multiple different instances of time. A transition detection module, formed of comparison elements, processes the sampled input signal at successive time instances to detect transitions in the input signal in terms of time. An output module generates detected transitions in the input signal on multiple parallel outputs.

Despite the existence of such configurations, further enhancements in time of flight imaging systems may be desirable in some applications.

SUMMARY

A time to digital converter (TDC) may include a sampling stage configured to sample an input signal based upon a plurality of timing signals having different respective phases, the sampling stage providing a respective output for each of the different timing signals. A first synchronization stage may be configured to receive the outputs from the sampling stage, synchronize a first subset of the outputs to a first one of the plurality of timing signals, and synchronize a second subset of the outputs to a second one of the plurality of timing signals. A second synchronization stage may be configured to receive the synchronized outputs from the first synchronization stage, and synchronize all of the synchronized outputs from the first synchronization stage to the first one of the plurality of timing signals.

More particularly, the TDC may further include a re-sampling stage coupled between the sampling stage and the first synchronization stage and configured to re-sample the outputs of the sampling stage based upon the plurality of timing signals, and provide the re-sampled outputs to the first synchronization stage. The TDC may also include a memory coupled to the second re-synchronizing stage and configured to store the outputs therefrom in a plurality of different timing windows or bins.

By way of example, the sampling stage may include a plurality of flip-flops each configured to receive the input signal and a respective one of the timing signals. Furthermore, the first synchronization stage may include a first plurality of flip-flops each configured to receive a respective output of the first subset and the first timing signal, and a second plurality of flip-flops each configured to receive a respective output of the second subset and the second timing signal. Additionally, the second re-synchronization stage may include a plurality of flip-flops each configured to receive the first timing signal and a respective one of the synchronized outputs from the first synchronization stage.

Further, the input signal may be from an optical detector array configured to generate a digital pulse responsive to reflected light energy from light pulses generated by an optical source. Moreover, the optical source may be configured to alternate generation of the light pulses based upon the different phases of the plurality of timing signals.

An optical ranging device may include an optical source configured to generate light pulses, and at least one optical detector array configured to detect reflected light based upon the generated light pulses and to generate a digital signal representing the detection of reflected light. The device may further include a phase locked loop (PLL), DLL, oscillator, or similar timing circuit configured to generate a plurality of timing signals having different respective phases, and a TDC (such as the one described briefly above) coupled to the at least one optical detector array and the timing circuit.

A related method for performing time to digital conversion may include sampling an input signal with a sampling stage based upon a plurality of timing signals having different respective phases, and providing a respective output for each of the different timing signals. The method may further include receiving the outputs from the sampling stage at a first synchronization stage and synchronizing a first subset of the outputs to a first one of the plurality of timing signals, and synchronizing a second subset of the outputs to a second one of the plurality of timing signals. Furthermore, the method may also include receiving the synchronized outputs from the first synchronization stage at a second synchronization stage, and synchronizing all of the synchronized outputs from the first synchronization stage to the first one of the plurality of timing signals.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
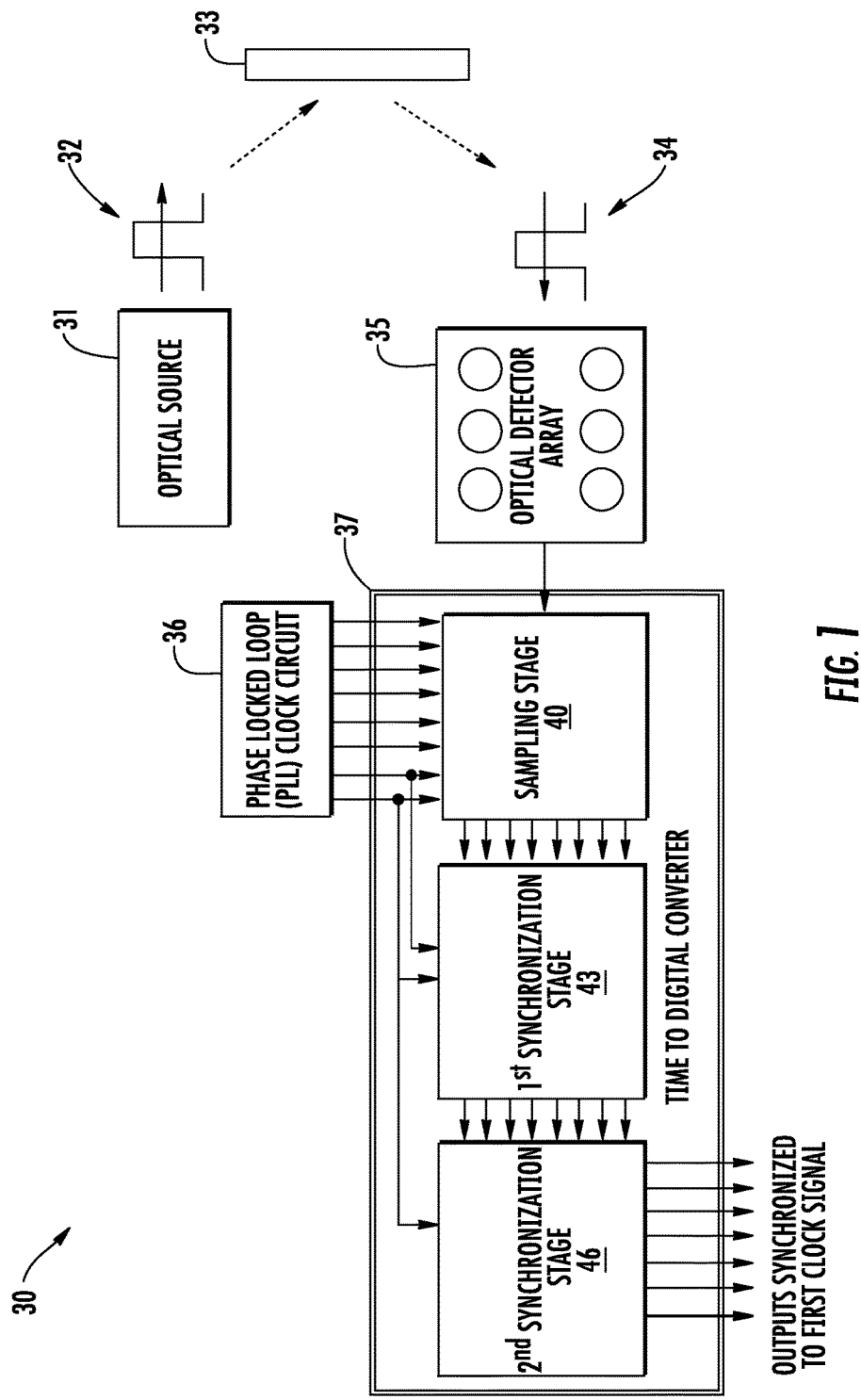
FIG. 1 is a schematic block diagram of an optical ranging device in accordance with an example embodiment.
Figure 2:
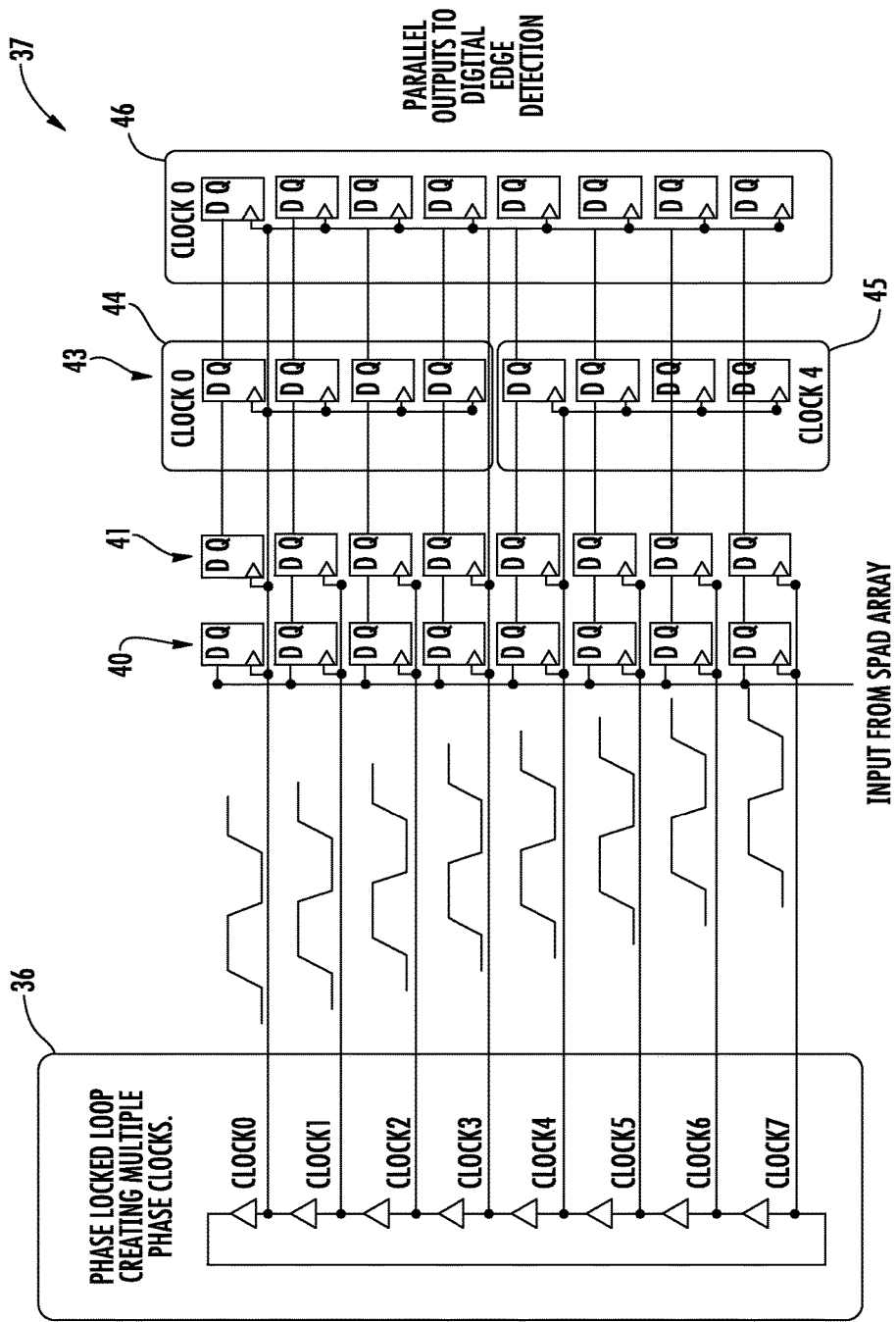
FIG. 2 is a schematic diagram of an example embodiment of the time to digital converter of the optical ranging device of FIG. 1.

Referring initially to FIGS. 1 and 2, an optical ranging (or time of flight imaging) device 30 illustratively includes an optical source 31 configured to generate light pulses 32. By way of example, the optical source 31 may include one or more vertical cavity surface emitting laser (VCSEL) diodes, although other optical source devices may also be used in different embodiments. In the illustrated configuration, the light pulses 32 are directed at a target 33, from which reflected light pulses 34 are received by an optical detector array 35. By way of example, the optical detector array may be a SPAD array, although other optical detector configurations may also be used in different embodiments. The optical detector array 35 generates a digital signal (e.g., logic high) representing the detection of reflected light.

The device 30 further illustratively includes phase locked loop (PLL) clock circuitry which is configured to generate a plurality of timing or clock signals (Clock0-Clock7) having different respective phases, as seen in FIG. 2. The digital signal output from the optical detector array 35 and the clock signals (Clock0-Clock7) from the PLL clock circuit 36 are provided as inputs to a flash time to digital converter (TDC) 37. By way of background, a flash TDC provides 37 for edge detection (e.g., a transition from logic low to logic high) as well as extraction of histogram data by comparing the timing of pulses arriving from an input source (e.g., a SPAD OR or XOR tree) with respect to the timing of defined clock pulses. A TDC provides a digital approach to range finding, and may be used to provide histogram outputs to maximize the information available to the end user.

One example edge detection configuration for a folded flash TDC is set forth in the above-noted U.S. Pat. Pub. No. 2015/0041625, which is an exclusive OR (XOR) tree approach, in which a digital signal includes pulses that change state whenever an event is observed at the input. A change in event is seen between consecutive Q nodes of input flip-flops, producing a high value and the corresponding output from a corresponding XOR gate coupled to the output of the flip-flop. This high value is then sampled by the output flip-flops, and the subsequent output causes output ripple counters to make a transition. Similarly, for an OR tree approach, only a rising edge pulse is detected. The inverted output of the previous flop is ANDed with the output of the current flop to detect a high transition, and the basic principle is the same as with the XOR based approach.

A potential drawback of such configurations is that the respective clocks for the flip-flops are all clocked from different clock domains. This means that the management of data on the flop outputs may require management by custom logic, and it may difficult to arrange such logic using a standard synthesis/place and route flow. As a result, implementation of such an approach may be manually intensive and time consuming. Moreover, while it is theoretically possible to add some programmability in terms of bin allocations (bin widths, overall periods, etc.), this may be difficult in practice due to the different clock domains in use. Additionally, it may also be difficult to place multiple TDC channels in parallel due to congestion of timing critical routing.

The embodiment shown in FIGS. 1 and 2 advantageously allows for the outputs to be synchronized within one clock domain. More particularly, the TDC 37 illustratively includes a sampling stage 40 configured to sample the digital signal output by the optical detector array 35 based upon the clock signals output from the PLL clock circuitry 36. The sampling stage 40 illustratively includes a respective flip-flop (here D flip-flops) for each of the clock signals. In the embodiment of FIG. 2, the sampling stage 40 is followed by a re-sampling stage 42 of flip-flops 41 (also D flip-flops in the illustrated example). The re-sampling stage 41 is configured to re-sample the outputs of the sampling stage 40 based upon the plurality of clock signals, and provide a respective output from each flip-flop of the re-sampling stage for each of the different clock signals. The re-sampling stage 41 may advantageously be included to re-sample the outputs of the sampling stage 40 under the same phases to help avoid metastable (mid-rail) conditions, such as when the digital signal goes high at the same time as a clock signal, for example. However, it should be noted that the re-sampling stage 41 need not be included in all implementations.

The re-sampled outputs are provided to a first synchronization stage 43, which in FIG. 2 illustratively includes an array of flip-flops (here D type flip-flops). The first synchronization stage 43 is configured to synchronize a first subset of the outputs to a first one of the plurality of clock signals, and synchronize a second subset of the outputs to a second one of the plurality of clock signals. In the illustrated example, a first group of the flip-flops 44 of the first synchronization stage 43 are coupled to the clock 0 signal, while a second group of the flip-flops 45 is coupled to the clock 4 signal. In this way, the first subset of the outputs is synchronized to the clock 0 signal, and the second subset of output is synchronized to the clock 4 signal.

Figure 3:
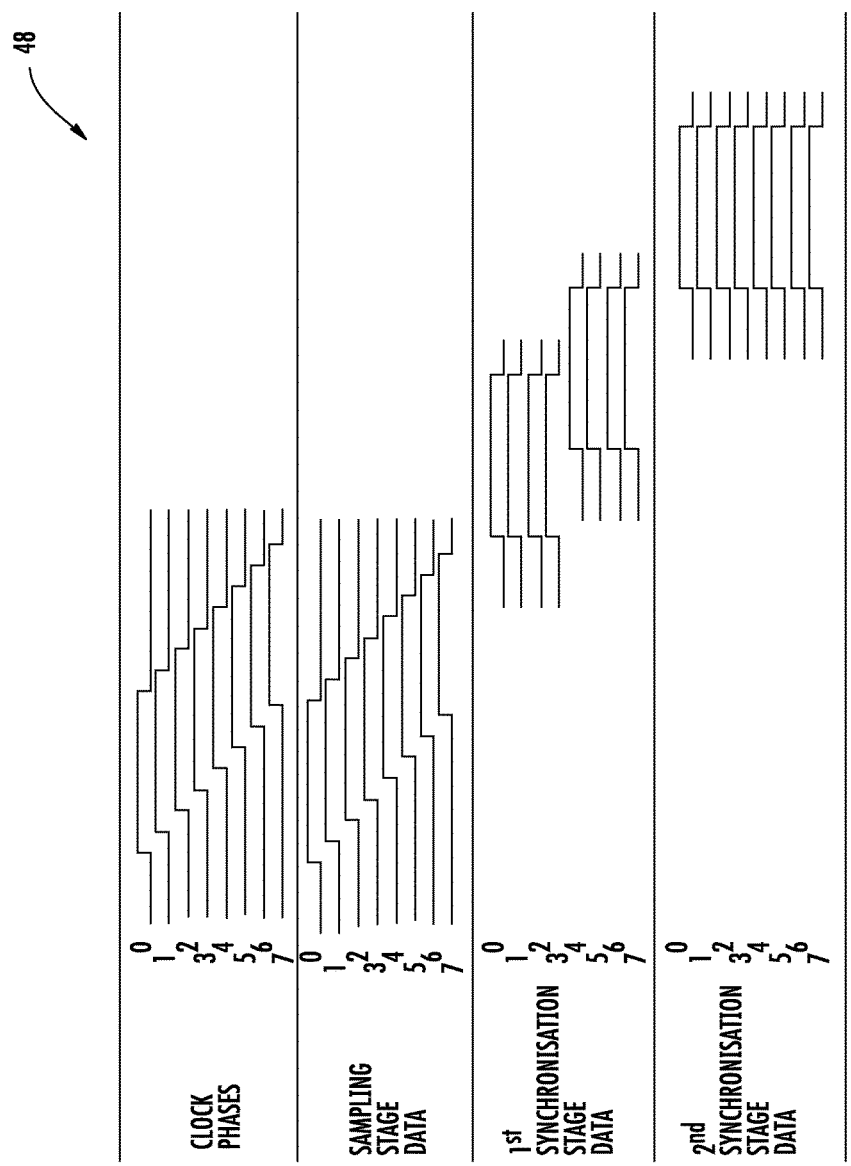
FIG. 3 is a digital timing diagram illustrating signal outputs for the various stages of the time to digital converter of FIG. 2.

Furthermore, a second synchronization stage 46 is coupled to the first synchronization stage 43 and is configured to receive the synchronized outputs from the first synchronization stage, and synchronize all of the synchronized outputs from the first synchronization stage to the first one of the plurality of clock signals, which in the illustrated example of FIG. 2 is the clock 0 signal. An example pulse sample and resynchronization analysis is shown in the timing diagram 48 of FIG. 3. Here, it may be seen that at an initial time, each of the outputs is synchronized to its respective clock signal or phase. After processing by the first synchronization stage 43, the first four outputs are synchronized to a same phase, as are the last four outputs. Finally, after processing by the second synchronization stage 46, all of the outputs are synchronized to the same phase 0 (i.e., of the clock 0 signal).

The TDC 37 accordingly allows the input signal to be first sampled onto different clock phases provided by the multi-phase PLL clock circuitry 36, and then to be re-synchronized to a single desired clock signal, such as the system clock (e.g., the clock to be used by synthesized digital logic which will be described further below). Since the outputs from the TDC 37 are all within one clock domain, they may be relatively easily managed/manipulated as required. For example, the signals may be digitally multiplexed to respective counters of choice. Moreover, different modes may be multiplexed to different counters with no crossing of clock domains and risk of timing violation, as will be discussed further below. It should be noted that while two synchronization stages are shown in the illustrated example, in some configurations a single synchronization stage, or more than two synchronization stages, may be used.

Figure 4A:
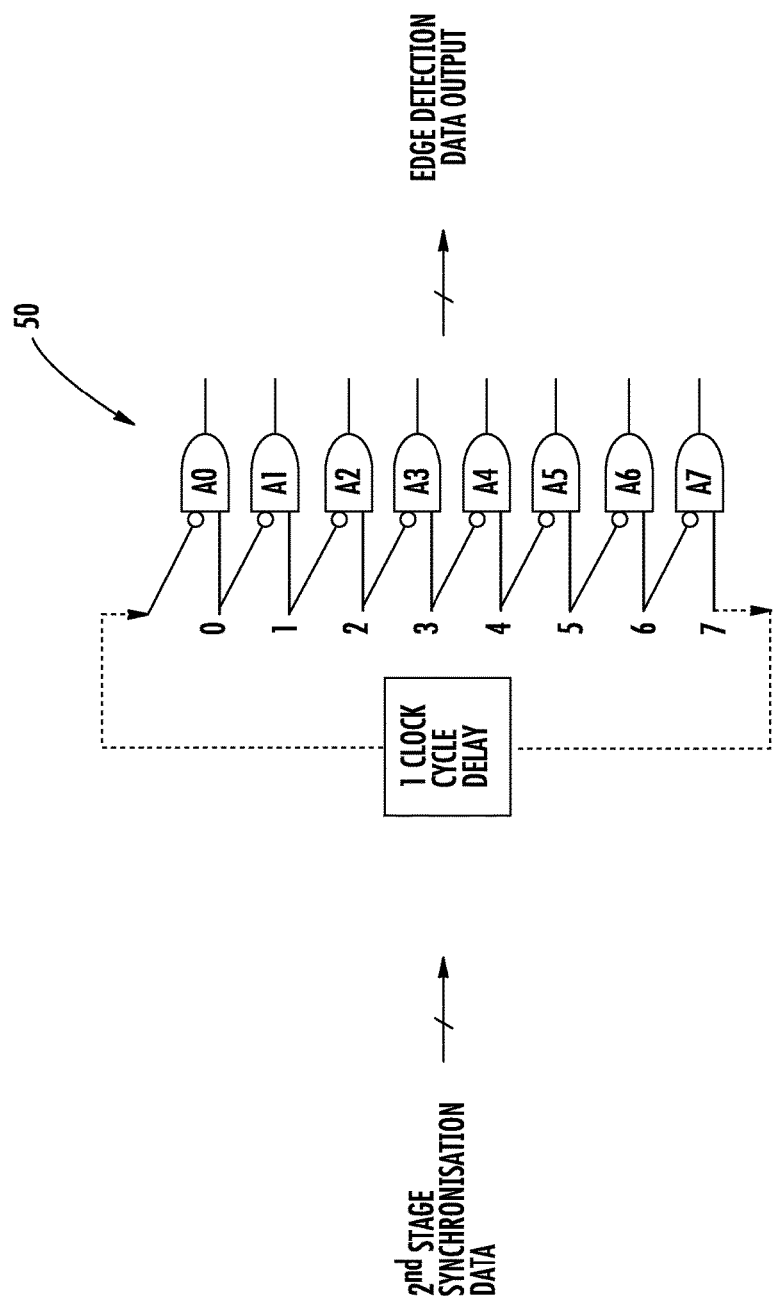
FIG. 4A is a schematic diagram of example logic circuitry which may be used for pulse edge detection based upon the synchronized output signals from the time to digital converter of FIG. 3.
Figure 4B:
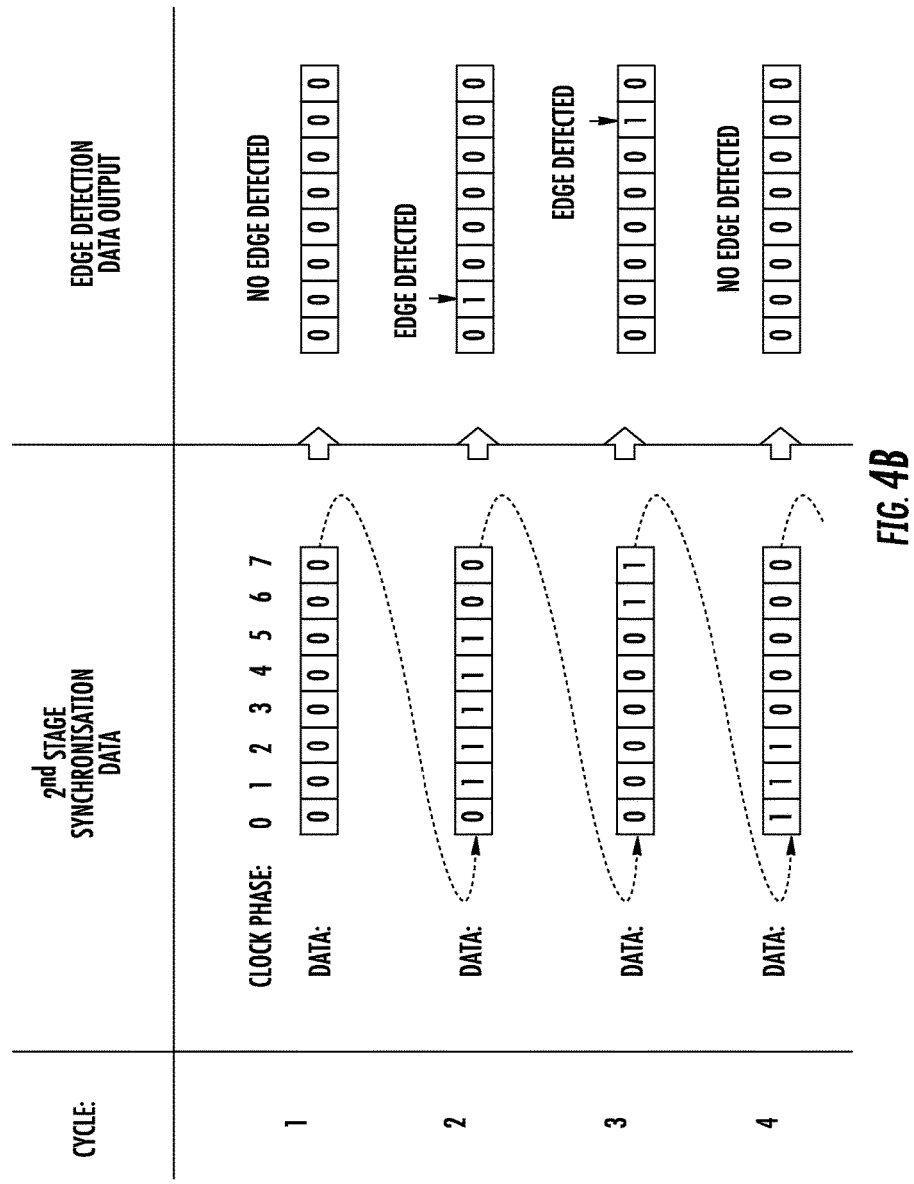
FIG. 4B is diagram of synchronized output data illustrating an edge detection operation by the logic circuitry of FIG. 4A.

Edge detection circuitry may be located either after the sampling stage 40, or downstream from the TDC 37, for example. One example edge detection circuit 50 is illustrated in FIG. 4A. The edge detection circuit 50 illustratively includes an array of AND gates A0-A7, each of which receives a respective non-inverted output from the second synchronization stage 46, as well as the preceding output from the second synchronization stage which has been inverted. In the example illustrated in FIG. 4B, the outputs are all logic zeros during the first clock cycle, but during the second and third clock cycles an edge detection event occurs, which results in the detection of a pulse rising edge as a logic one on the output of the AND gate A0.

Figure 5:
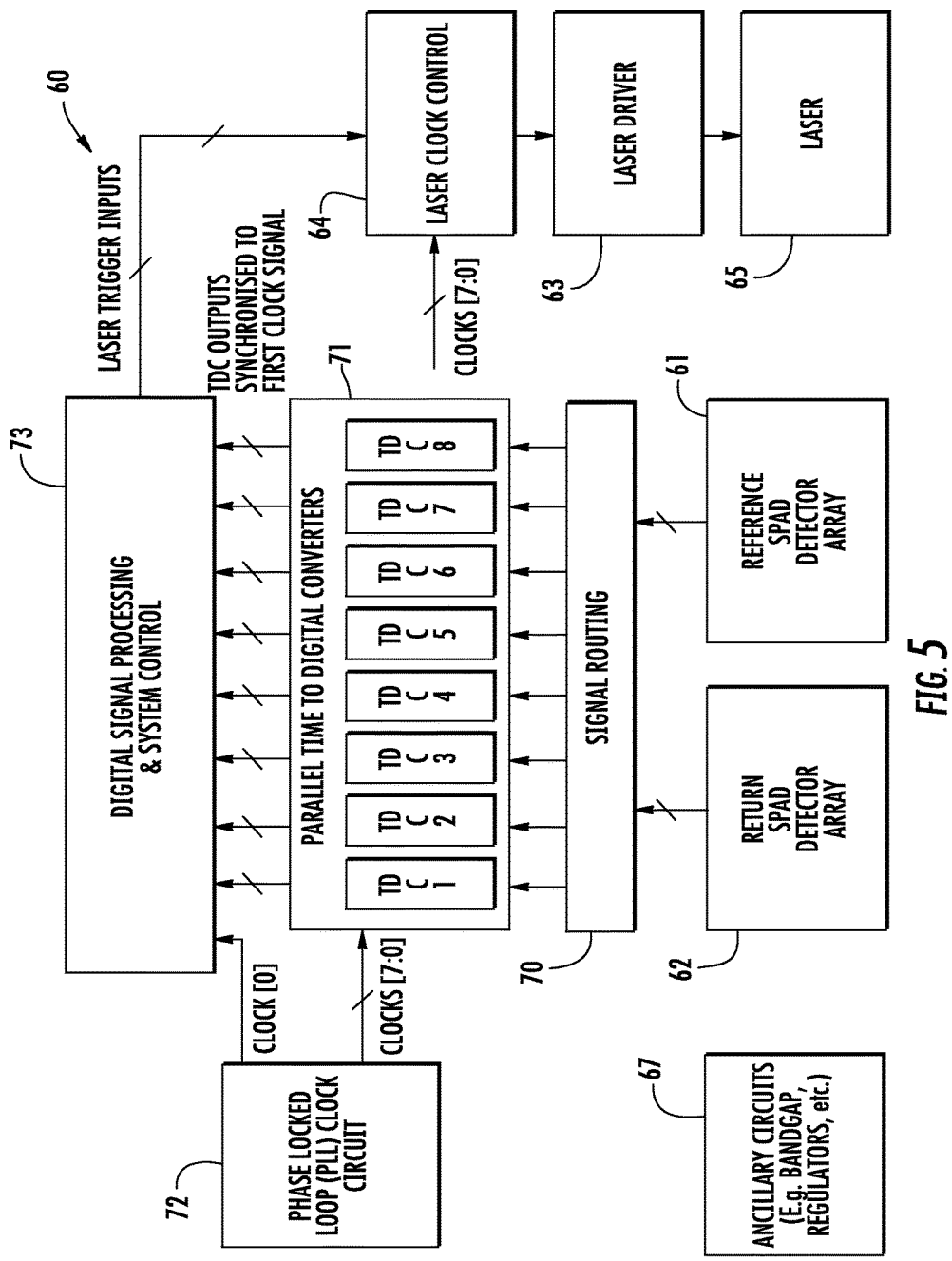
FIG. 5 is a schematic block diagram of an example optical ranging device including target and reference detector arrays in accordance with an example embodiment.

Turning additionally to FIG. 5, another example optical ranging system 60 is now described. In the illustrated example, the system 60 includes a reference SPAD detector array 61 in addition to a return or target SPAD detector array 62. Both the reference SPAD array 61 and the return SPAD array 62 may include multiple sets of SPADs. The system 60 further illustratively includes an optical source such as a LASER 65 (for example, a VCSEL), a LASER driver 63, and an associated LASER clock controller 64 cooperate to provide the optical source pulses as described above. Other ancillary circuitry 67 such as bandgap regulators, etc., may also be included as appropriate. Furthermore, in the illustrated configuration, return pulses are obtained from both the reference SPAD array 61 (from an internal reference target) and the return SPAD array 62 (from an external target) to allow for comparisons therebetween.

Since both the reference SPAD array 61 and the return SPAD array 62 are used in this configuration, a signal routing network 70 is provided to select whether the outputs of the reference SPAD array or the return SPAD array are provided to TDC circuitry 71. The TDC circuitry 71 operates similarly to the TDC 37 described above with reference to FIGS. 1 and 2 except that here it provides respective sets of outputs for each of the reference SPAD array 61 or the return SPAD array 62. Here again, PLL circuitry 72 provides the multi-phase clock signals to the TDC 37.

In the present example, digital signal processing and control logic 73 is downstream from the TDC circuitry 71 and receives the synchronized outputs therefrom. The logic 73 may provide integrated sigma delta front end and histogram control functions, for example. It may also include the above-described edge detection circuitry 50. More particularly, the logic 73 may include a plurality of range calculation modules 74. In accordance with one example, these may include histogram counter banks implemented in a memory which count occurrences of edge detections in respective bins corresponding to the different clock phases to provide for histogram generation. Other range calculation approaches may include sigma delta loops, averaging, etc.

Figure 6:
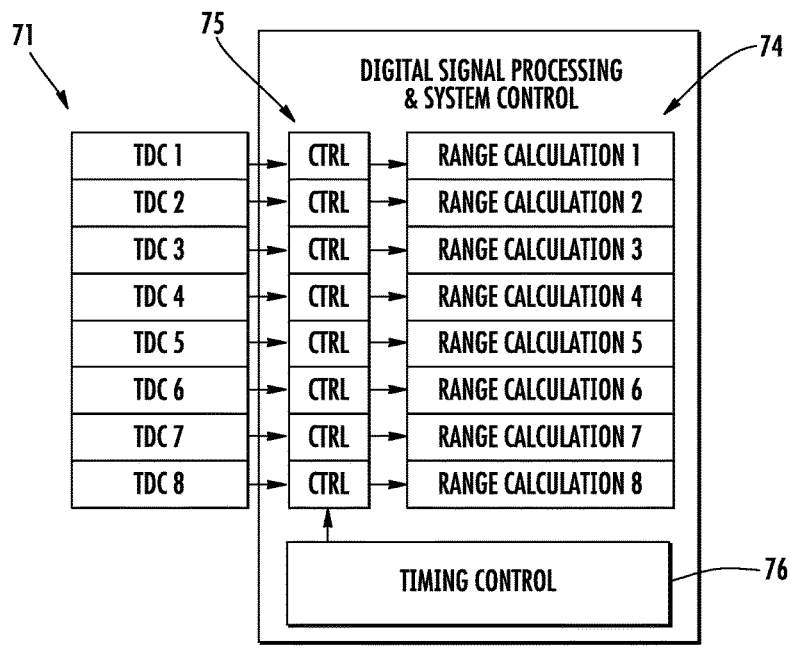
FIGS. 6 and 7 are schematic block diagrams of individual and shared counter/bin configurations, respectively, which may be used with the optical ranging device of FIG. 5.

One example configuration of the range calculation modules 74 is shown in FIG. 6, in which there is a respective range calculation module (Range Calculation 1-Range Calculation 8) for each TDC circuit 71 (TDC1-TDC8), along with associated control circuitry 75 for each TDC/range calculator pair and a timing controller 76 for the control circuitry. A table is also shown in FIG. 6 illustrating exemplary histogram periods for associated step sizes.

Figure 7:
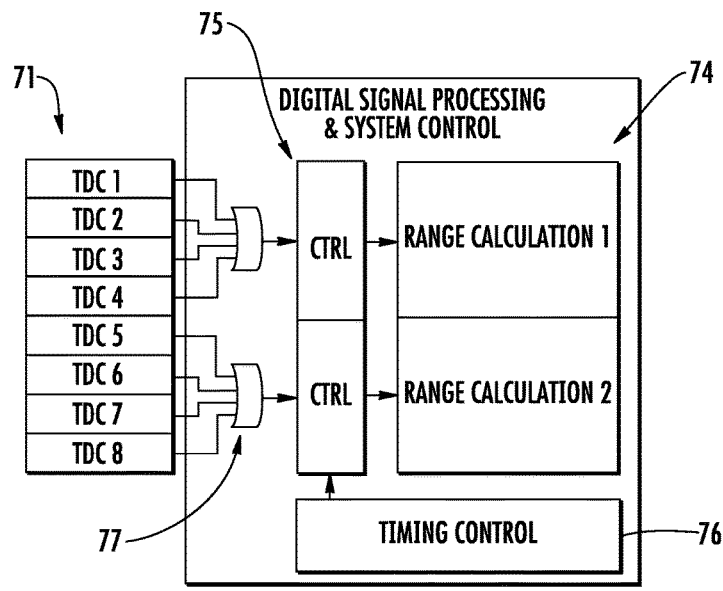

An alternative arrangement is shown in FIG. 7, in which shared range calculator modules 74 (Range Calculation 1 and Range Calculation 2) are used for respective groups of TDCs 71. In the illustrated example, simple OR gates 77 are shown to combine the outputs of the respective groups of TDCs 71, which loses some information in a "pile up" scenario and thus results in slower performance, as seen in the associated table in FIG. 7. In some embodiments, a pipelined or more sophisticated counter control may be used to help offset this pile up. Yet, despite having reduced resolution with respect to the configuration shown in FIG. 6, the configuration shown in FIG. 7 with shared counters/bins extends the overall range of the histogram.

Figures 8, 9:
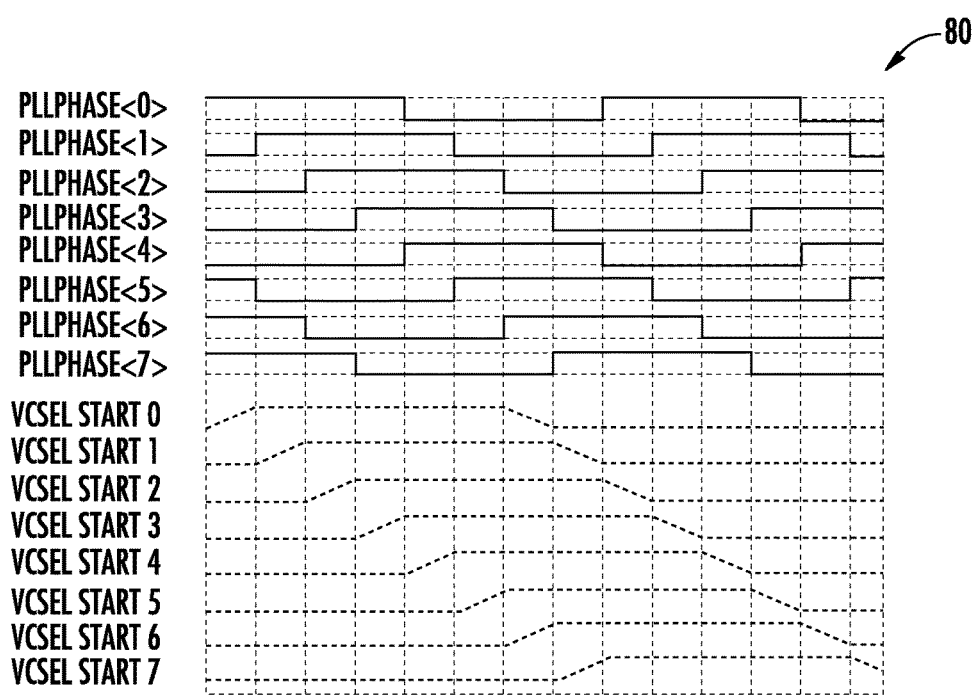
FIG. 8 is a timing diagram illustrating an example optical source phase sequencing approach which may be used with the system of FIG. 1.
FIG. 9 is a table illustrating various phase sequences for the start position of an optical pulse for the approach illustrated in FIG. 8.

Referring additionally to FIGS. 8 and 9, in some instances an asynchronous timing mismatch will bring width error in systems such as that of FIG. 6 which use timing bins to build timing information. By way of example, the source of such bin width errors may be random logic gate delay mismatches, voltage supply variation (from ground disturbances), and/or threshold voltage variation where the input signal is sampled. Various calibration approaches are sometimes employed with respect to bin width errors. One such technique is compensation using ambient input to evaluate bin width mismatches. However, this approach may require a significant amount of ambient signal to cancel the effect of photon shot noise, which may be time consuming (especially in low light), and not suitable for "on the fly" calibration. Moreover, while this approach gives information on the relative widths of this bins, it does not directly give information on their positions in time. Rather, a separate algorithm is required to take this information and apply it to the final range.

Another calibration approach is to use PLL phase multiplexing to bin inputs. This approach may require the addition of a multiplexing network to the front end of the histogram bins. While this may cancel some of the error, the multiplexing network will add its own mismatch to the system. Moreover, this approach also means that several accumulation phases are required, since it rotates the timing information applied to each bin with respect to the input pulse.

To help mitigate the above-noted bin width errors, in some embodiments of the above-described systems a VCSEL pulse control approach may be used to shift the VCSEL pulse onto a different clock phase in each cycle. The output from each TDC 71 is multiplexed so the phases output from the TDC are always aligned to the respective phase of the input VCSEL waveform. Since this multiplexing is done in a synchronous digital domain, no additional error is introduced by the multiplexing. The VCSEL waveform then "sees" every bin location and the associated error. The final range result averages the errors across all bins. Considered alternatively, the VCSEL phase rotation occurs before the output signal takes a differential path through the reference and return arrays. Any minor errors in rotation circuitry is not significant for ranging.

In the timing diagram 80 of FIG. 8 and associated VCSEL start position table 90 of FIG. 9, it may be seen that the VCSEL pulse start (VCSEL START 0-VCSEL START 7) occupies each of the eight locations associated with the eight different phases PLLPHASE<0>-PLLPHASE<7>, which thereby helps to average and effectively eliminate any bin mismatch errors. The output signal multiplexing means the shift is transparent to the digital readout.

Figure 10:
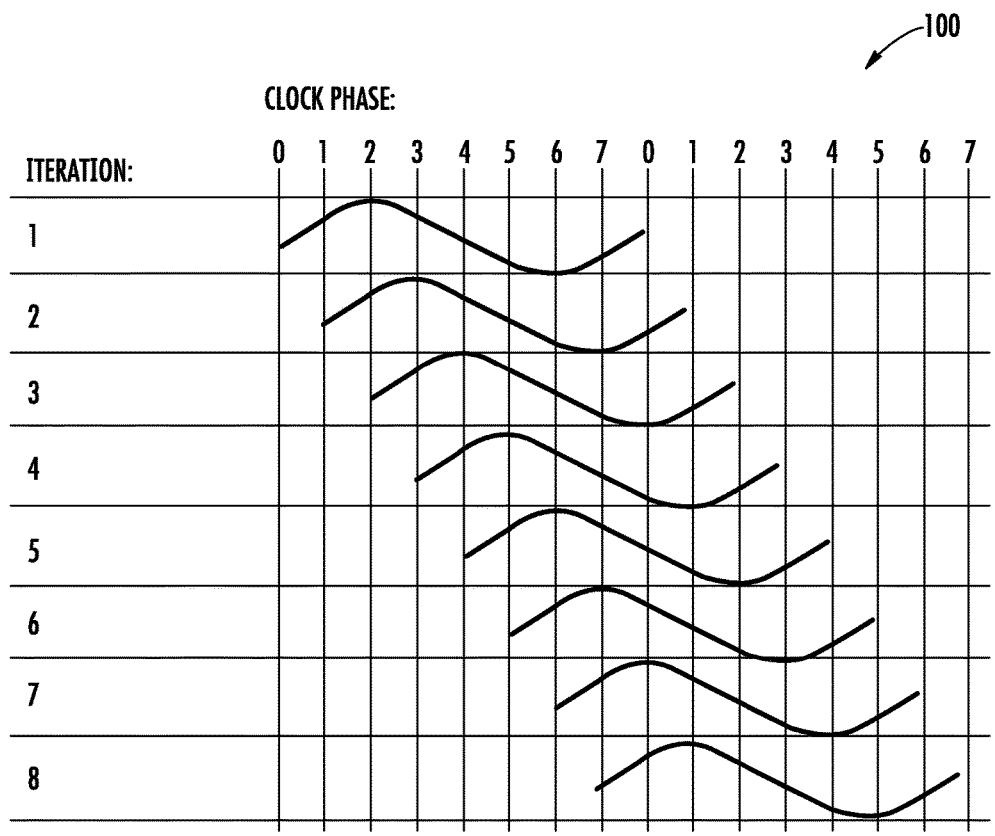
FIG. 10 is a timing diagram for an example sine-based optical source phase sequencing approach similar to that of FIG. 7.

Still another example VCSEL control configuration is a sine configuration, which is shown in the timing diagram 100 of FIG. 10. This approach may utilize phase control on the eight phase inputs from the PLL 72. It may also provide flexible control for PLL phase steps in full, half, or quarter increments. The digital processor 74 provides an eight phase input bus (although other numbers of counters/phases may be used), and the programmable phase step is a multiple of one phase. The digital signal may be resampled and shifted in phase in the LASER control block 64. In accordance with another example approach, the phase of a sine waveform may be shifted. Moreover, this approach may also be applied to other waveform shapes, such as triangular waveforms, for example. Whatever the waveform shape used, the basic operating principle of progressively altering the start position of the waveform triggering the laser remains the same. It should also be noted that the same phase control strategy may be applied with other light sources besides VCSELs, such as LEDs, other LASERs, etc.

Figure 11:
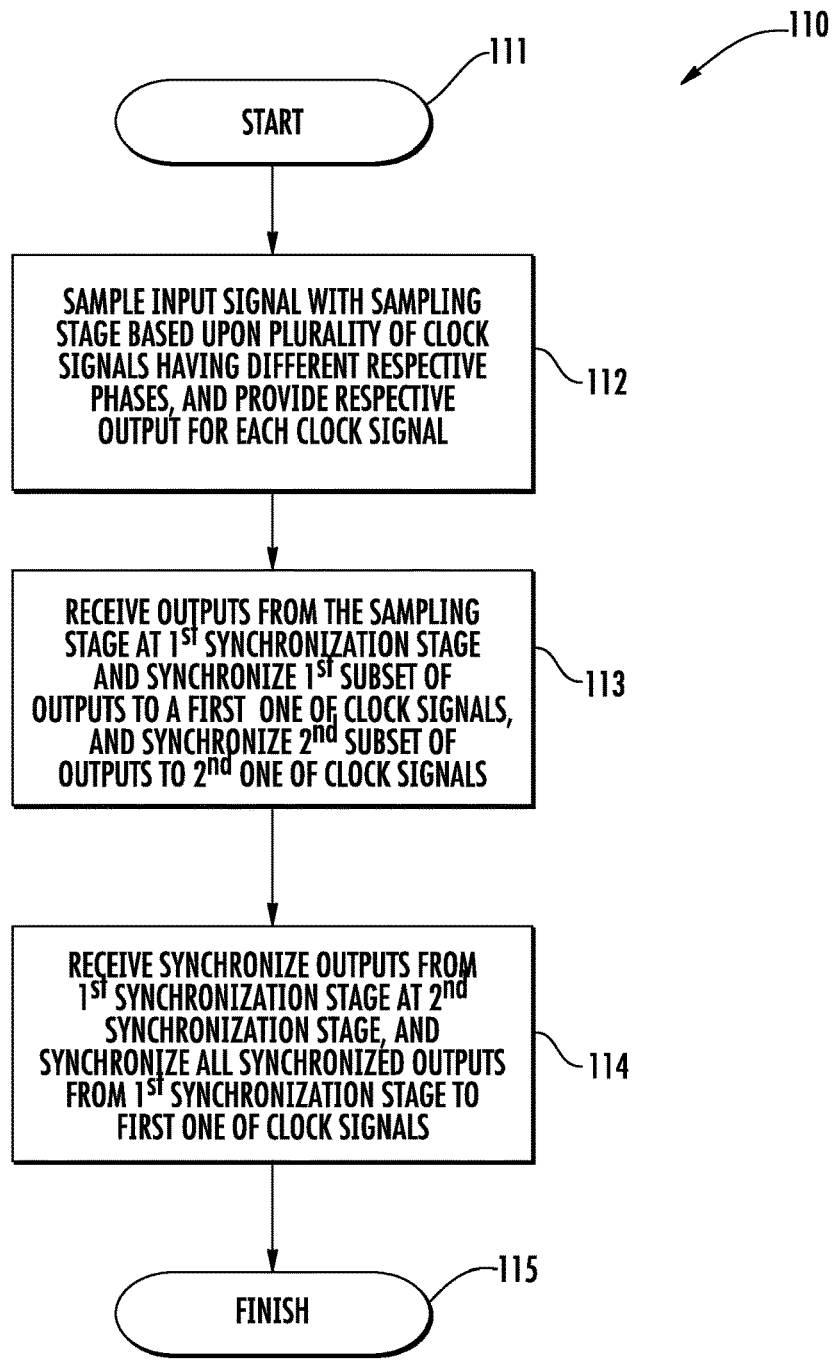
FIG. 11 is a flow diagram illustrating a method for performing time to digital conversion in accordance with an example embodiment.

Referring additionally to the flow diagram 110 of FIG. 11 in conjunction with FIG. 1, a related method for performing time to digital conversion is now described. Beginning at Block 111, the method illustratively includes sampling an input signal with a sampling stage 40 based upon a plurality of clock signals having different respective phases (e.g., from PLL clock circuitry 36), and providing a respective output for each of the different clock signals, at Block 112. The method may further include receiving the outputs from the sampling stage 40 at a first synchronization stage 43 and synchronizing a first subset of the outputs to a first one of the plurality of clock signals, and synchronizing a second subset of the outputs to a second one of the plurality of clock signals, at Block 113. Furthermore, the method may also include receiving the synchronized outputs from the first synchronization stage 43 at a second synchronization stage 46, and synchronizing all of the synchronized outputs from the first synchronization stage to the first one of the plurality of clock signals, at Block 114, as described further above, which illustratively concludes the method of FIG. 11 (Block 115).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A time to digital converter (TDC) comprising:
   a sampling stage configured to sample an input signal based upon a plurality of timing signals having different respective phases, and provide a respective output for each of the different timing signals;
   a first synchronization stage configured to receive the outputs from said sampling stage, synchronize a first subset of the outputs to a first one of the plurality of timing signals, and synchronize a second subset of the outputs to a second one of the plurality of timing signals; and
   a second synchronization stage configured to receive the synchronized outputs from said first synchronization stage, and synchronize all of the synchronized outputs from said first synchronization stage to the first one of the plurality of timing signals, wherein the input signal is from an optical detector array configured to generate a digital pulse responsive to reflected light energy from light pulses generated by an optical source, and wherein the optical source is configured to alternate generation of the light pulses based upon the different phases of the plurality of timing signals.

2. The TDC of claim 1 further comprising a re-sampling stage coupled between said sampling stage and said first synchronization stage and configured to re-sample the outputs of said sampling stage based upon the plurality of timing signals, and provide the re-sampled outputs to said first synchronization stage.

3. The TDC of claim 1 further comprising a memory coupled to said second re-synchronizing stage and configured to store the outputs therefrom in a plurality of different bins.

4. The TDC of claim 1 wherein said sampling stage comprises a plurality of flip-flops each configured to receive the input signal and a respective one of the timing signals.

5. The TDC of claim 1 wherein said first synchronization stage comprises a first plurality of flip-flops each configured to receive a respective output of the first subset and the first timing signal, and a second plurality of flip-flops each configured to receive a respective output of the second subset and the second timing signal.

6. The TDC of claim 1 wherein said second re-synchronization stage comprises a plurality of flip-flops each configured to receive the first timing signal and a respective one of the synchronized outputs from said first synchronization stage.

7. An optical ranging device comprising:
   an optical source configured to generate light pulses;
   at least one optical detector array configured to detect reflected light based upon the generated light pulses, and to generate a digital signal representing the detection of reflected light;
   a phase locked loop (PLL) timing circuit configured to generate a plurality of timing signals having different respective phases; and
   a time to digital converter (TDC) coupled to said at least one optical detector array and said PLL timing circuit and comprising
      a sampling stage configured to sample the digital signal based upon the plurality of timing signals having different respective phases, and provide a respective output for each of the different timing signals, a first synchronization stage configured to receive the outputs from said sampling stage, synchronize a first subset of the outputs to a first one of the plurality of timing signals, and synchronize a second subset of the outputs to a second one of the plurality of timing signals, and a second synchronization stage configured to receive the synchronized outputs from said first synchronization stage, and synchronize all of the synchronized outputs from said first synchronization stage to the first one of the plurality of timing signals, wherein the optical source is configured to alternate generation of the light pulses based upon the different phases of the plurality of timing signals.

8. The optical ranging device of claim 7 wherein said TDC further comprises a re-sampling stage coupled between said sampling stage and said first synchronization stage and configured to re-sample the outputs of said sampling stage based upon the plurality of timing signals, and provide the re-sampled outputs to said first synchronization stage.

9. The optical ranging device of claim 7 wherein said TDC further comprises a memory coupled to said second re-synchronizing stage and configured to store the outputs therefrom in a plurality of different bins.

10. The optical ranging device of claim 7 wherein said sampling stage comprises a plurality of flip-flops each configured to receive the input signal and a respective one of the timing signals.

11. The optical ranging device of claim 7 wherein said first synchronization stage comprises a first plurality of flip-flops each configured to receive a respective output of the first subset and the first timing signal, and a second plurality of flip-flops each configured to receive a respective output of the second subset and the second timing signal.

12. The optical ranging device of claim 7 wherein said second re-synchronization stage comprises a plurality of flip-flops each configured to receive the first timing signal and a respective one of the synchronized outputs from said first synchronization stage.

13. The optical ranging device of claim 7 wherein said optical source comprises at least one vertical cavity surface emitting laser (VCSEL).

14. The optical ranging device of claim 7 wherein said at least one optical detector array comprises at least one single photon avalanche diode (SPAD) array.

15. A method for performing time to digital conversion comprising:

sampling an input signal with a sampling stage based upon a plurality of timing signals having different respective phases, and providing a respective output for each of the different timing signals;

receiving the outputs from the sampling stage at a first synchronization stage and synchronizing a first subset of the outputs to a first one of the plurality of timing signals, and synchronizing a second subset of the outputs to a second one of the plurality of timing signals; and receiving the synchronized outputs from the first synchronization stage at a second synchronization stage, and synchronizing all of the synchronized outputs from the first synchronization stage to the first one of the plurality of timing signals, wherein the input signal is from an optical detector array configured to generate a digital pulse responsive to reflected light energy from light pulses generated by an optical source, and wherein the optical source is configured to alternate generation of the light pulses based upon the different phases of the plurality of timing signals.

16. The method of claim 15 further comprising re-sampling the outputs of the sampling stage at a re-sampling stage coupled between the sampling stage and the first synchronization stage based upon the plurality of timing signals, and providing the re-sampled outputs to the first synchronization stage.

17. The method of claim 15 further comprising storing the outputs from the second re-synchronizing stage in a memory in a plurality of different bins.

18. A time to digital converter (TDC) comprising:

a sampling stage configured to sample an input signal based upon a plurality of timing signals having different respective phases, and provide a respective output for each of the different timing signals; and at least one synchronization stage configured to receive the outputs from said sampling stage and synchronize all of the outputs to a first one of the plurality of timing signals, wherein the input signal is provided to the sampling stage from an optical detector array configured to generate a digital pulse responsive to reflected light energy from light pulses generated by an optical source adjacent to the optical detector, and wherein the optical source is configured to alternate generation of the light pulses based upon the different phases of the plurality of timing signals.

19. The TDC of claim 18 further comprising a re-sampling stage coupled between said sampling stage and said at least one synchronization stage and configured to re-sample the outputs of said sampling stage based upon the plurality of timing signals, and provide the re-sampled outputs to said at least one synchronization stage.

* * * * *